INVENTOR.
Hubert Reber
BY Lee H Kaiser
Attorney

Sept. 20, 1966  H. REBER  3,274,320

METHOD OF ENCAPSULATING TRANSFORMER

Filed July 29, 1963  2 Sheets-Sheet 2

INVENTOR.
Hubert Reber
BY Lee H. Kaiser
Attorney 3,274,320
METHOD OF ENCAPSULATING TRANSFORMER
Hubert Reber, Zanesville, Ohio, assignor to McGraw-Edison Company, Milwaukee, Wis., a corporation of Delaware
Filed July 29, 1963, Ser. No. 298,103
3 Claims. (Cl. 264—135)

This invention relates to encapsulated electrical transformers and more particularly to a method of constructing encapsulated coils for electrical distribution transformers.

It is known in the manufacture of electrical transformers to encapsulate the coils in an insulating resin jacket so they will be substantially unaffected by moisture, atmospheric conditions, and shock. One disadvantage of conventional encapsulating methods is that air frequently becomes entrapped in the interstices of the coil. Such air inclusions, or voids may cause corona and result in impairment of the electrical characteristics of the transformer. Such air inclusions can be reduced by impregnating the coil with a liquid insulating dielectric before the encapsulating step. However, cracks are often caused in the encapsulating resin jacket during temperature cycling of the transformer due to differences in the coefficients of expansion of the metal parts of the coil, the encapsulating resin, and the impregnating dielectric used to displace the air. The coefficient of expansion of the impregnating dielectric is higher than that of any of the other components of the coil, and consequently the mechanical stresses tending to crack the resin encapsulating jacket increase in proportion to the amount of insulating dielectric in the coil.

It is an object of the invention to provide a method of constructing encapsulated coils for electrical transformers which positions the highest dielectric strength insulation at the places within the coil where the voltage stress is greatest and fills the interstices within other portions of the coil with encapsulating resin, whereby the mechanical stresses due to differences in rates of expansion between the impregnating and encapsulating materials tending to crack the encapsulating jacket are minimized.

It is a further object of the invention to provide a method of constructing encapsulated coils for electrical transformers which disposes porous insulating material impregnated with liquid dielectric in the barrier, interlayer, and exterior insulation of the coil and encapsulating resin within other portions of the coil so that mechanical forces tending to crack the encapsulating jacket are minimized.

These and other objects and advantages of the invention will be more readily apparent from the following detailed description when taken in conjunction with the accompanying drawing wherein.

Figure 1:
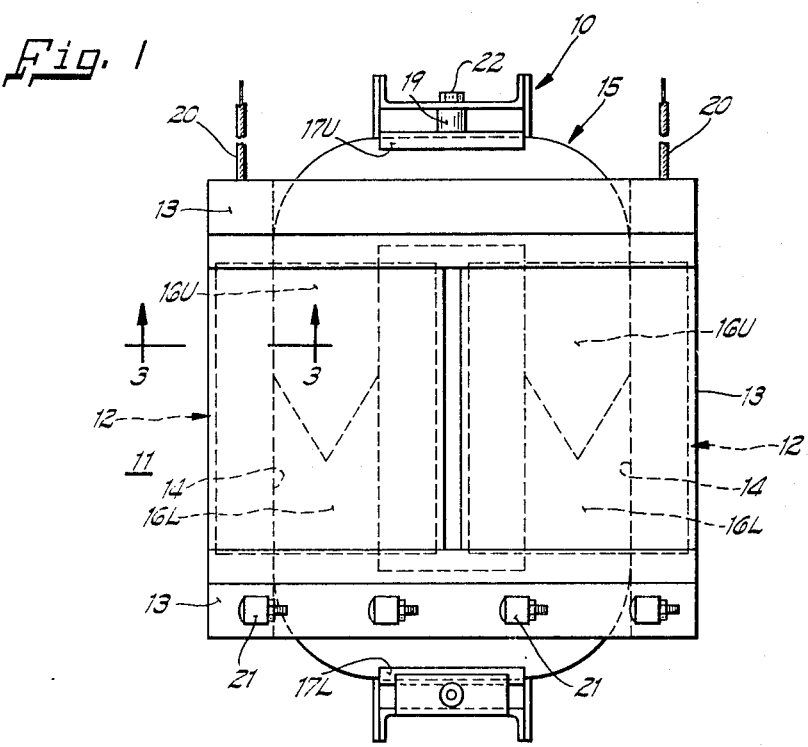
FIG. 1 is a front elevation view of an encapsulated transformer constructed in accordance with the method of the invention.
Figure 2:
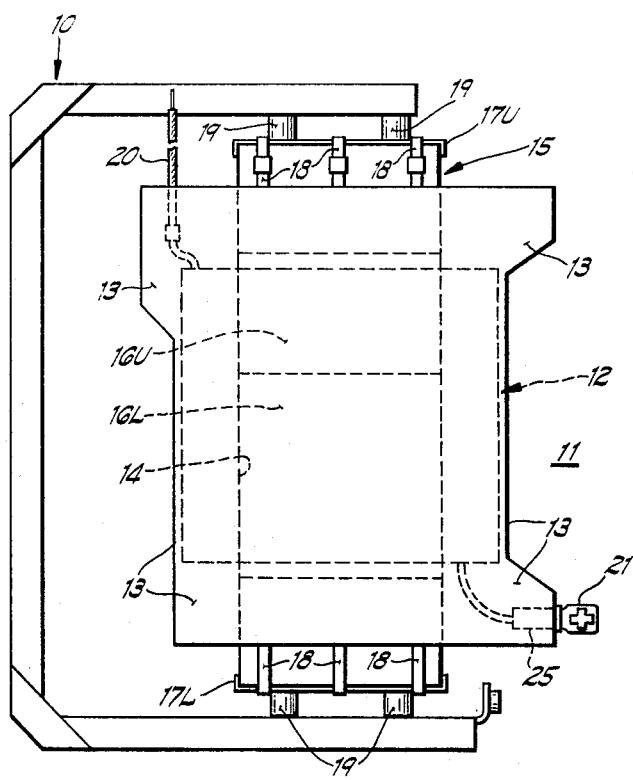
FIG. 2 is a side elevation view of the transformer shown in FIG. 1.
Figure 3:
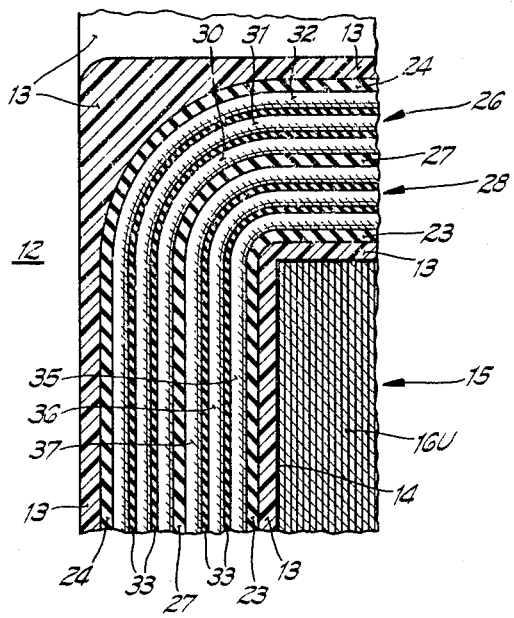
FIG. 3 is a view taken on line 3—3 of FIG. 1.
Figure 4:
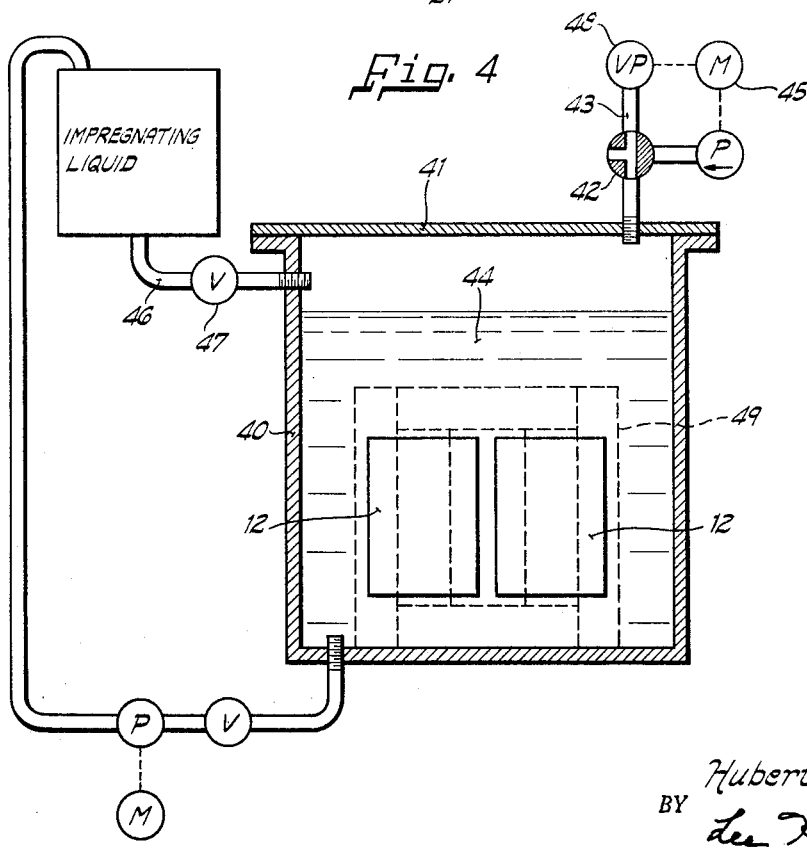
FIG. 4 is a vertical section view through an enclosure suitable for the steps of inpregnating and encapsulating the coils of the transformer of FIG. 1.

The method of the invention is particularly adapted for the construction of encapsulated coils for electrical distribution transformers. The entire transformer core and coil assembly may be encapsulated as a unit in a thermosetting resin jacket or, as illustrated in the drawing, the coils may be constructed separately and encapsulated with a resin jacket before they are assembled with the laminations of the magnetic core. A U-shaped metallic mounting bracket 10 adapted to be mounted on a pole (not shown) supports a transformer core and coil assembly 11. The transformer core and coil assembly 11 includes a pair of cylindrical coils 12 of rectangular cross section disposed in side-by-side relation and embedded in a thermosetting resin jacket 13. A vertically elongated window may be provided in jacket 13 between the coils 12 to facilitate cooling. The coils 12 have vertically extending axial openings 14 through which the laminations of magnetic core 15 are assembled after the coils 12 are embedded in resin jacket 13. Magnetic core 15 preferably comprises upper and lower complementary U-shaped halves of nested U-shaped laminations 16U and 16L which are inserted into the axial openings 14 in the coils 12 and abut in core joints (not shown) within the axial openings 14. Upper and lower core clamps 17U and 17L are secured to and urged against the U-shaped core halves 16U and 16L by banding straps 18 which surround the mating U-shaped core halves 16U and 16L and hold the core laminations in abutting relation. Internally threaded studs 19 welded to the upper and lower core clamps 17U and 17L are affixed to the mounting bracket 10 by bolt means 22. Stub cables 20 molded within resin jacket 13 adjacent the upper end of coils 12 during the encapsulating step are electrically connected to the primary winding sections of coils 12. A plurality of secondary terminals 21 affixed within inserts 25 molded in resin jacket 13 adjacent the lower end of coils 12 are electrically connected to the secondary winding sections of coils 12.

Coil 12 may be wound on a suitable mandrel and includes tubular inner insulation 23 covering the inner periphery thereof which electrically isolates the windings from the magnetic core 15. Inner insulation 23 may include a plurality of layers of a film of insulating material (not shown) which facilitates release of the coil from the mold after encapsulation, a plurality of layers of fiberglass (not shown) in mat form to provide a moisture seal after encapsulation, and a plurality of layers of suitable cellulosic insulating material such as Kraft, rag, or manila paper which has preferably been impregnated with phenylene diamine to increase the thermal stability as disclosed in the copending application of Fred S. Sadler, Serial No. 268,401 having the same assignee as the present invention. As described hereinafter such thermally stabilized cellulosic insulating material is preferably used in the barrier, interlayer, and inner and outer wrappings for the coil 12. A wrapping of outer insulation 24 covering the exterior of coil 12 may comprise a plurality of layers of such thermally stabilized cellulosic insulating material (not shown) and a layer of fiberglass tape. Each coil 12 may comprise a radially outer primary winding section 26 separated by a high-low insulating barrier 27 from a secondary winding section 28 radially inward therefrom. Insulating barrier 27 preferably comprises a plurality of layers of such thermally stabilized porous cellulosic insulating material wound to a sufficient thickness to provide the desired dielectric breakdown strength between primary winding 26 and secondary winding 28. Primary winding 26 may include a plurality of layers of conductor turns 30, 31 and 32 separated by interlayer insulation 33 of such thermally stabilized, porous cellulosic insulating material disposed between the barrier 27 and the outer insulation 24. Secondary winding 28 may include a plurality of layers of conductor turns 35, 36 and 37 separated by layers 33 of thermally stabilized, porous cellulosic insulating material between the inner insulation 23 and the barrier 27.

In accordance with the invention, the portions of coil 12 subjected to the highest voltage stress, i.e., the barrier, interlayer, and the inner and outer insulations are constructed of porous insulating material, preferably thermally stabilized cellulosic insulation, impregnated with a suitable insulating dielectric such as impregnating oil. The coils 12 are dried in an oven at approximately 250° F. for sixteen hours to remove moisture. The coils may then be removed from the oven and positioned within a hollow container 40 of a suitable impregnating unit. The interior of container 40 is then sealed off from the atmosphere by means including a cover 41, the interior of container 40 is connected through a valve 42 to a conduit 43 communicating with a vacuum pump 48 driven by a motor 45, and a vacuum of a few millimeters of mercury is drawn on container 40 to evacuate through conduit 43 the moisture from the coils 12 for approximately four hours. A suitable insulating dielectric 44 such as transformer oil is preheated to approximately 180° F. and subjected to a vacuum of a few millimeters of mercury for approximately four hours. While a vacuum is still being drawn on container 40, the insulating dielectric liquid 44 may be admitted into evacuated container 40 through a conduit 46 connected thereto through a valve 47. The impregnating oil 44 is drawn into container 40 to a level completely covering the coils 12. The impregnating oil 44 flows into the coils 12 and displaces the air from and fills all of the interstices of coils 12 wherein air had been entrapped. Preferably the impregnating cycle is continued for an hour while vacuum is continually drawn on the container 40. Air at a pressure of approximately ninety pounds per square inch is then introduced into chamber 40 above the impregnating liquid 44 to force the oil into the innermost interstices within the coils 12.

After the impregnating step is completed, the coils 12 are removed from the bath of impregnating oil 44 within container 40, and the impregnating oil 44 is permitted to drain off from coils 12. At first the draining of impregnating oil 44 is in a steady stream as the oil flows from within the spaces between adjacent copper turns in the conductor layers 30–32 and 35–37 and from the voids and pockets within the coils 12 such as the spaces between the overlapping layers of the end turn reinforcements (not shown). The draining step is continued until all impregnating oil 44 has flowed from the coils 12 except that retained by capillary attraction within the pores of the porous insulation members such as 23, 24, 27 and 33 and the oil 44 falls slowly in drops from the coils 12. The optimum dripping time is dependent upon many variables such as the kva. size of the transformer, the operating voltage, the method of winding, the size of the pores in the insulating material, the viscosity of the impregnating oil, and the viscosity and temperature of the encapsulating resin. In general, the dripping time is proportional to kva. size of the transformer and to the primary voltage of the transformer, and for a 7200 volt transformer with thermally stabilized paper insulation and transformer oil as the impregnating dielectric and an encapsulating resin of 100 centipoise viscosity, the following dripping times were found to be satisfactory at 20° C. ambient temperature:

| Transformer kva.: | Dripping time, minutes |
| --- | --- |
| Less than 1 | 5 |
| 10 | 15 |
| 25 | 30 |

The optimum dripping time is inversely proportional to the viscosity of the encapsulating resin used to form the resin jacket 13, and the following dripping times were found satisfactory for a 10 kva., 7200 volt transformer with thermally stabilized paper insulation and transformer oil as the liquid impregnant at 20° C. ambient temperature.

| Viscosity of encapsulating resin: | Dripping time. |
| --- | --- |
| Above 1000 centipoises | Less than 5 minutes. |
| 1000 to 50 centipoises | 5 to 60 minutes. |
| Below 20 centipoises | Apply heat. |

The optimum dripping time is proportional to the viscosity of the impregnating oil and inversely proportional to the viscosity of the encapusulating resin. The dripping time may be shortened by heating the impregated coil 12 during the draining step to thereby lower the viscosity of the impregnating oil. For example, the coil 12 may be heated during the draining step to approximately the temperature at which the encapsulating resin will be cured, and with encapsulating resins of low viscosity it was found desirable to heat the core and coil assembly to approximately 250° F. during the draining step. The time of draining is not critical and should be continued until all impregnating liquid 44 is removed from the coils 12 except that retained by capillary attraction within the pores of the paper insulation 23, 24, 27, and 29 and the oil falls in slow drops from the coils 12.

The coils 12 are then placed side-by-side in a mold 49 (shown in outline only in dotted lines), crossover connections may be made between the coils 12, and conductors from the primary and secondary winding may be suitably positioned in the mold. The mold containing the side-by-side coils may then be placed in a suitable chamber such as container 40, the cover 41 placed thereon, the container sealed, and a vacuum of a few millimeters of mercury drawn on the container. A liquid thermosetting encapsulating resin such as a low viscosity epoxy or ethoxylene resin containing an appropriate hardener such as methyl nadic anhydride and a suitable filler such as slate flour may then be introduced into the mold while vacuum is being drawn on the container. The encapsulating resin fills all the spaces within the coils 12 in which the impregnating oil 44 is not retained by capillary attraction and thoroughly envelops the coils 12. The liquid encapsulating resin displaces the air from all interstices, crevices, and openings in the coils 12 except the pores within the paper insulation which are small enough to retain the impregnating oil 44 by capillary attraction. A vacuum may be drawn on the container for approximately two hours after the introduction of the encapsulating resin, and then air at a pressure of ninety to one hundred pounds per square inch pressure may be introduced into container 40. The coils 12 are then heated for approximately sixteen hours at 150° F., thereby causing the encapsulating resin to solidify into enclosing jacket 13. The coils 12 so enclosed in the solidified resin jacket 13 are then removed from the mold and baked in an oven at an elevated temperature to convert the encapsulating resin into an infusible solid. For example, the encapsulated coils 12 may be baked at approximately 250° F. for twenty-four hours to cure the epoxy resin and convert it into the infusible state. The laminations of magnetic core 15 are then inserted into the axial openings 14 in coils 12 and secured therein by banding straps 18.

It will be appreciated that the places within the coils 12 such as the barrier 27, layers 33 between conductor turns, and inner and outer coverings 23 and 24 which are subject to the highest potential stress are insulated by material of maximum dielectric strength, namely, porous insulation, impregnated by transformer oil. Crevices cracks, spaces, and openings within the coils 12 larger than the pores which retain the impregnating oil by capillary attraction are filled by the encapsulating resin. Only the optimum amount of impregnating oil desirable for purposes of insulation is retained within the coils 12, and consequently the mechanical stresses tending to crack the resin jacket 12, arising from the differences in the coefficients of expansion of encapsulating and impregnating materials, are minimized. Further, since coils 12 are not in the mold during impregnation as is required with other known encapsulating processes, the impregnating oil does not interfere with release of the solidified resin jacket from the mold.

While only a single mode of practicing the invention has been illustrated and described, many modifications and variations thereof will be readily apparent to those skilled in the art, and consequently it is intended in the appended claims to cover all such modifications and variations which fall within the true spirit and scope of the invention.

I claim:

1. In the method of constructing an electrical transformer including a magnetic core linked by an encapsulated cylindrical coil having concentric layers of conductor turns, the steps of providing porous insulation between said conductor layers of said coil, immersing said coil in a liquid insulating dielectric impregnant, whereby said impregnant displaces air within the interstices of said coil, draining said liquid impregnant from said coil except that retained by capillary attraction within the interstices in said porous insulation, enveloping said coil in thermosetting encapsulating resin in liquid form, and curing said thermosetting resin.

2. In the method of constructing an electrical transformer including a magnetic core linked by an encapsulated cylindrical coil having concentric layers of conductor turns, the steps of providing porous insulation between said conductor layers of said coil, immersing said coil in a liquid insulating dielectric impregnant, draining said liquid dielectric impregnant from said coil except that retained by capillary attraction in said porous insulation and for a period of time until said liquid impregnant falls slowly in drops from said coil, enveloping said coil in a thermosetting encapsulating resin in liquid form, and curing said thermosetting encapsulating resin, said period of time for draining said impregnant from said coil being a function of the kva. size of said transformer and being inversely proportional to the viscosity of said encapsulating resin.

3. In the method of constructing an electrical transformer including a magnetic core linked by an encapsulated cylindrical electrical coil having primary and secondary windings each comprised of concentric layers of conductor turns, the steps of providing porous insulation between said conductor layers of each said winding and between said primary and secondary windings and at the internal and exterior surfaces of said cylindrical coil, immersing said coil in a liquid insulating dielectric impregnant, draining all of said liquid insulating dielectric impregnant from said coil except that retained by capillary attraction within said porous insulation and for a time until said liquid impregnant falls slowly in drops from said coil, placing said transformer in a mold, introducing a thermosetting encapsulating resin in liquid form into said mold until it envelops said coil, and curing said encapsulating resin.

References Cited by the Examiner

UNITED STATES PATENTS

| | | | |
|---|---|---|---|
| 2,459,018 | 1/1949 | De Monte et al. | 264—272 X |
| 2,656,290 | 10/1953 | Berberich et al. | 264—272 X |
| 2,857,626 | 10/1958 | Wagner et al. | 264—272 X |
| 3,071,496 | 1/1963 | Fromm et al. | 264—272 X |
| 3,233,311 | 2/1966 | Giegerich et al. | 264—272 X |

ROBERT F. WHITE, *Primary Examiner.*

L. S. SQUIRES, *Assistant Examiner.*